March 3, 1970   SHIGEO ONO   3,498,195
ELECTRONIC SHUTTER SPEED ADJUSTING MEANS
Filed Oct. 4, 1967
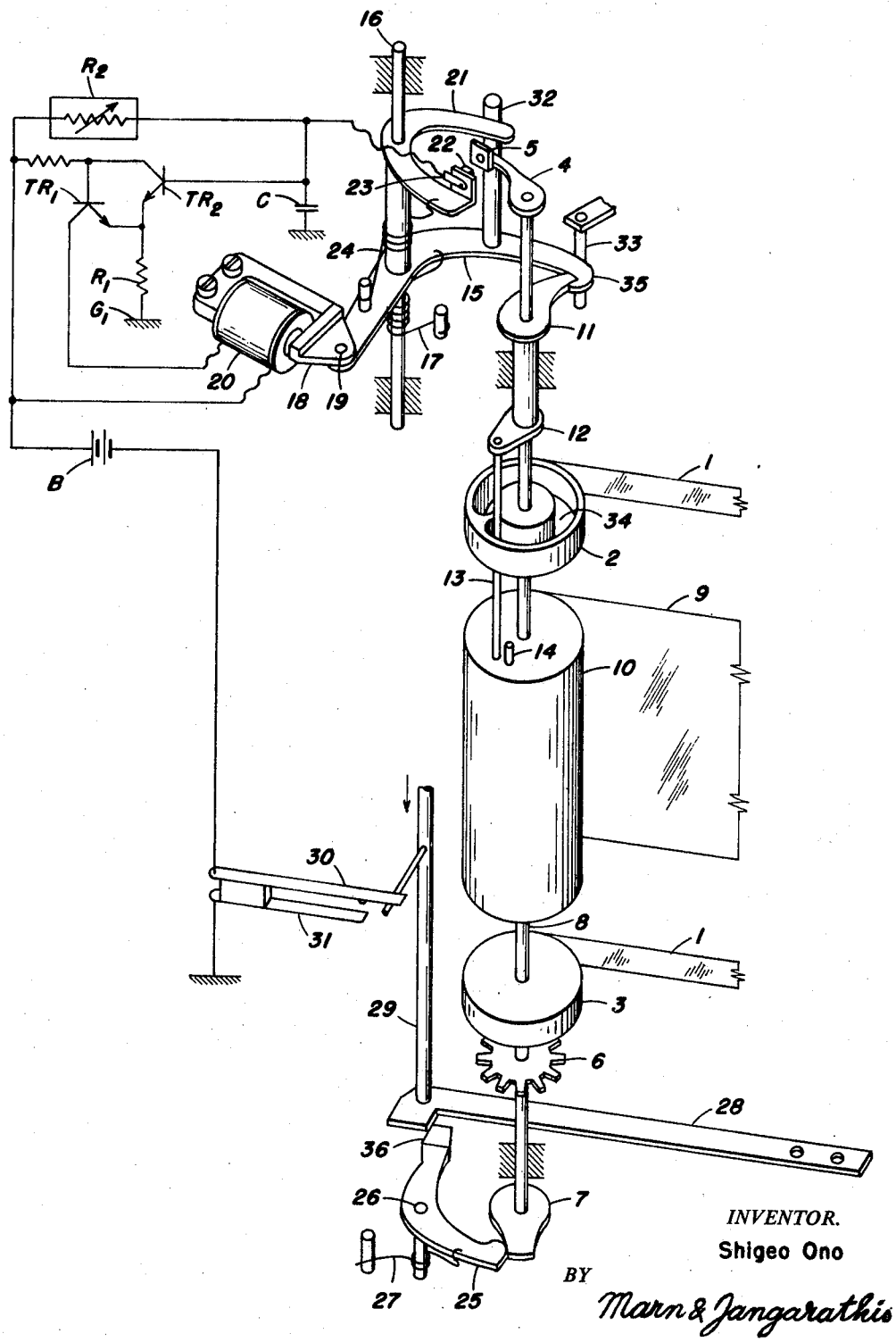
INVENTOR.
Shigeo Ono
BY
Marn & Jangarathis
ATTORNEYS the following detailed description thereof in conjunction
United States Patent Office 3,498,195
Patented Mar. 3, 1970

3,498,195
ELECTRONIC SHUTTER SPEED ADJUSTING MEANS
Shigeo Ono, Yokohama-shi, Japan, assignor to Nippon Kogaku K.K., Tokyo, Japan, a corporation of Japan
Filed Oct. 4, 1967, Ser. No. 672,838
Claims priority, application Japan, Oct. 7, 1966, 41/93,711 (utility model)
Int. Cl. G01j 1/00, 1/52; G03b 9/28
U.S. Cl. 95—10                                11 Claims

ABSTRACT OF THE DISCLOSURE

An electronic shutter is provided with a speed adjusting means wherein a variable time delay circuit is caused to be energized by a separate lever which is actuated by a front screen lever. After the predetermined delay has run, a rear screen lever is released and, under the urging of the separate lever, releases the rear screen. No lag time compensating means is necessary when this apparatus is utilized and the mean portions of the shutter consist of conventional type structure which had previously been used in prior mechanical devices.

---

This invention relates to electronic camera shutters and more particularly to novel electronic shutter apparatus which has unique means therein for changing the speed of the electronic shutter.

In the simplest focal plane shutter of a camera, an opaque curtain or screen bearing a slit opening is passed directly across and in front of the film near the focal plane, the width of the slit and the speed of its movement determining the duration of the exposure. In present day cameras, two curtains or screens are employed, with the front screen being activated before the rear screen. With this differential movement, of course, much faster exposures are possible. The time interval between the opening of the front and rear screens has been regulated by prior art speed changing means. Where the speed changing means of the prior art was a wholly mechanical device, structural as well as functional restrictions were found to be present. Where the speed changing means of the prior art were electronic, although the efficiency and exposure range of the shutter were greatly increased, it was previously imperative to provide compensating means for the time lag caused by the operation of the electro-magnet in the system. These electronic systems however, still provided a substantial advance over prior art mechanical systems because of their compactness, high efficiency and wide exposure range. An additional difficulty present in prior art electronic shutters, from a manufacturing standpoint, was that their structure was wholly alien to the previously-used mechanical systems. Thus, their structure necessitated such a substantial amount of retooling as well as worker re-education, that the adoption of these electronic shutters was found by many manufacturers to be prohibitively expensive.

Therefore, it is an object of the present invention to provide an electronic shutter having electronic speed changing means therein which does not utilize or require a time lag compensating device and which has a substantial number of structural components commonly used in prior art mechanical speed changing devices. Various other objects and advantages of the invention will become clear from the following detailed description of an embodiment thereof, and the novel features will be particularly pointed out in connection with the appended claims.

In accordanc with the invention an electronic shutter is provided in which the shutter speed can be easily and accurately changed while the main portion of the shutter consists of conventional type structure which has previously been used in prior mechanical devices. The invention will be more clearly understood by reference to the following detailed description thereof in conjunction with the accompanying drawings, which is a perspective view of an embodiment of the invention. Portions of the camera body and other conventional parts are not shown so that the invention will be seen more clearly.

The electronic shutter of the figure shows front screen strips 1 connected for front screen pulleys 2 and 3, which are mounted on the shaft 8. Additionally, a lever 4 having a grounded contact 5 thereon, a toothed gear 6 utilized for winding up the screens, and a starting cam 7 are mounted directly on shaft 8. The rear screen drum 10 and the cam 11 together with lever 12, which is fixedly mounted to the cam 11, are rotatably mounted on shaft 8. The rear screen 9 is shown connected to and wound around rear screen drum 10. The lever 12 is provided with a pin 13 which extends through the free groove 34 in front screen pulley 2 and abuts pin 14 of drum 10.

A lever 15 is mounted on a shaft 16 which is rotatably mounted in the camera body. The lever 15 is utilized to control the rear screen and is biased to rotate in the counterclockwise direction by spring bias means 17. The lever 15 has a hooked portion 35 at one end thereof which is formed to engage cam 11. The other end of lever 15 is pivotably connected by pin 19 to the ferromagnetic member 18. The member 18 is mounted for engagement with electro-magnet 20 which is attached to the camera body. A lever 21 is rotatably mounted on shaft 16 and has a contact 22 mounted thereon. The contact 22 is insulated from lever 21 and is mounted thereon so as to face the contact 5 and the lug 23 which is connected to said contact. The lever 21 is biased to rotate in the counterclockwise direction by spring bias means 24. The spring bias means 24 is anchored to lever 15 so as to exert a bias force thereon. Spring 24 is designed to exert a greater biasing force than spring 17.

Latch means 25 is provided for initiating the movement of the front and rear screens. The latch 25 is biased to exert force in the counterclockwise direction by spring 27. The latch is designed to engage starting cam 7 and to stop the rotation thereof when the screens are in a wound-up condition. The plate spring 28 is designed to engage the latch at the oblique portion 36 when the release rod 29 connected to the plate spring 28 is depressed as indicated by the arrow. The contact 30 of the electrical source switch formed by contacts 30 and 31 is additionally connected to release rod 29.

The winding up operation which is also referred to as cocking the shutter and which is ordinarily part of the film advance mechanism is accomplished by the action of conventional means, which form no part of this invention and hence are not shown, upon gear 6, to rotate said gear and thus shift 8 in the counterclockwise direction. Due to the counterclockwise rotation of shaft 8, pulleys 2 and 3, lever 4, and cam 7 which are fixedly mounted to shaft 8 rotate in the counterclockwise direction. In addition, due to the action of the end wall of groove 34 upon pin 13, the lever 12, the cam 11 which is fixedly connected to lever 12, and the drum 10, by means of the engagement of pins 13 and 14, are also rotated in the counterclockwise direction during this operation. When the winding operation has been completed, the elements mounted on shaft 8 are retained in the positions shown in the figure due to the action of the latch 25 upon cam 7.

During the winding up operation, lever 21 is prevented from rotating in the counterclockwise direction, (due to the bias exerted by spring 24) by the eccentric pin 32 mounted on lever 15. Therefore, lever 21 may only rotate in the counterclockwise direction in unison with lever 15. The lever 15 will rotate in the counterclockwise direction during this operation until it engages pin 33 which is mounted on the camera housing. When lever 15 engages pin 33, the hook portion 35 of lever 15 is outside the rotational locus described by the cam 11. As a consequence thereof, when contacts 5 and 22 are engaged just prior to the termination of the winding up operation, lever 21 rotates in the clockwise direction due to the force exerted on contact 22 by the contact 5 mounted lever 4. Because spring 24 as previously mentioned exerts a greater force than spring 17, the clockwise rotation of lever 21 causes lever 15 to also rotate in the clockwise direction until its rotation is stopped by the member 18 which is forced against magnet 20. When the clockwise rotation of lever 15 is stopped by the pressure of member 18 against magnet 20, the back portion 35 of lever 15 is in a position to engage the cam 11.

When the release rod 29 is thereafter depressed in the direction indicated by the arrow to operate the shutter release, the contacts 30 and 31 are pressed together thus closing the source switch. With the source switch closed, the energy of the battery B is applied to energize the circuit thereby placing it in the operational state. With the contacts 4 and 5 closed the transistor $TR_2$ has ground potential applied to its base and is thus in the off condition. The transistor $TR_1$ will however, be in the energized condition and current will thus flow from the battery B, through the magnet 20, thereby energizing it, through the transistor $TR_1$ to ground via resistor $R_1$. When the rod 29 is further depressed, plate spring 28 engages the oblique portion 36 of latch 25 to rotate the latch in a clockwise direction thereby releasing the starting cam 7. Since the strip 1 and the screen 9 always have tension applied to the ends thereof by conventional means which are not shown herein, the front screen system comprising pulleys 2 and 3 and lever 4 begin to rotate in the clockwise direction while the rear screen system comprising drum 10, cam 11 and lever 12 will tend to rotate in said clockwise direction. The lever 21, under the influence of bias spring 24, will rotate in the counterclockwise direction, thereby maintaining the contact between contacts 5 and 22, until the lever 21 is stopped by pin 32, at which time the contact between 5 and 22 is broken. When the counterclockwise rotation of the lever 21 is stopped by pin 32 the counterclockwise bias of spring 24 is thereby placed upon lever 15. The lever 15 however, can not rotate since it is retained in its present position by the action of magnet 20 on element 18. Since the lever 15 is thus prevented from rotating, cam 11 is engaged by hook 35 and therefore the cam 11, the lever 12 and the drum 10 are prevented from rotating.

When the contacts 5 and 22 are opened, condenser C begins to charge through a resistance $R_2$ which can be a photocell or a variable resistor. The transistor $TR_2$ will be placed in its on condition when a sufficient potential has been placed on the condenser C to properly bias the base thereof. With transistor $TR_2$ in the on condition, transistor $TR_1$ will be turned off thereby de-energizing the magnet 20. When magnet 20 is de-energized, element 18 is released and lever arm 15 is thus free to rotate, under the influence of spring bias means 17, in the counterclockwise direction until it is restrained by pin 33. This counterclockwise rotation of arm 15 disengages the cam 11 and the rear screen in thereby released.

The time interval between when the front screen and the rear screen are released can be accurately selected by the selection of a proper value of resistance of the variable resistor $R_2$. Furthermore, the resistor may be replaced by a photoconductive body whose resistance varies with the amount of light incident thereon.

Thus it can be seen that the present invention provides an electronic shutter having high sensitivity, which utilizes a substantial amount of structure of conventional focal plane shutters. Furthermore, conventional assembly techniques and experience may be used in its manufacture. In addition, because the charging of the condenser may be initiated just after the shutter operation has commenced, the displacement of the starting positions of the front and rear screens can be made equal to the displacement in a conventional shutter and therefore no special compensating means are required. Finally, apparatus made according to this invention is of relatively simple construction and is highly compact.

It should be noted that the device is highly reliable because the contacts connected to the lever arms remain in contact until the shutter is released thereby aiding to maintain the conductivity of their surface portion. Furthermore, any errors caused by irregularities in the strength of the spring can be compensated by decentering the lever stop pin mounted on the lower lever, which pin position may be adjustable.

The present invention is fully applicable to a single lens reflex camera, wherein the front and rear screen systems are separated so as to require individual shafts interrelated with gear trains.

While the invention has been described in connection with a specific embodiment thereof, it will be understood that many modifications will be readily apparent to one of ordinarly skill in the art; and that this application is intended to cover any adaptations or variations thereof. Therefore, it is manifestly intended that this invention be only limited by the claims and the equivalents thereof.

What is claimed is:

1. In a electronic shutter which controls a front and a rear screen, the apparatus comprising:
    a first lever which is rotatably mounted for controlling said rear screen, said first lever having a magnetically responsive element and a cam retarding means operably affixed thereto;
    a magnet mounted in an operative relationship to said magnetically responsive element;
    means to energize said magnet, said energizing means being adapted to be connected to a source of energy;
    a delay circuit, said delay circuit being effective upon its energization and after the expiration of a predetermined time interval to de-energize said magnet;
    a delay circuit starting lever having a first contact thereon;
    an interlock means connected between said first lever aid said delay circuit starting lever for interlocking the two levers together to control said rear screen;
    a bias means connected between said first lever and a support, said bias means exerting a lesser biasing force than said interlock means;
    cam means mounted for rotation with said rear screen, said cam means being further positioned with respect to said first lever to be acted upon by said cam retarding means to thereby control said rear screen; and
    a second lever having a second contact mounted thereon, said second lever being rotatable with said front screen and said second contact being mounted for engagement with said first contact when said delay circuit starting lever and said second lever are in a predetermined position, said first and second contacts being effective upon a break in the connection therebetween to energize said delay circuit.

2. The apparatus of claim 1, wherein said interlock means comprises a biasing means connected between said first lever and said delay circuit starting lever and an adjusting pin mounted on said first lever for engaging said delay circuit starting lever.

3. The apparatus of claim 1, wherein said delay circuit comprises a resistor and a capacitor.

4. The apparatus of claim 1, wherein said first and second contacts, when in engagement, apply a reference potential to the circuit connected to said first contact.

5. The apparatus of claim 1, wherein said cam means is engaged by said cam retarding means when said magnetically responsive element is in engagement with said magnet.

6. The apparatus of claim 1, wherein said delay circuit is variable whereby said predetermined time interval is selectively determined.

7. The apparatus of claim 6, wherein said variable delay circuit comprises a variable resistance photocell.

8. The apparatus of claim 6, wherein said variable delay circuit comprises a variable resistor.

9. The apparatus of claim 8, wherein said cam means is engaged by said cam retarding means when said magnetically responsive element is in engagement with said magnet.

10. The apparatus of claim 9, wherein said first lever and said delay circuit starting lever have a common axis of rotation; and wherein said interlock means comprises a biasing means connected between said first lever and said delay circuit starting lever and an adjusting pin mounted on said first lever for engaging said delay circuit starting lever.

11. In an electronic shutter which controls a front and a rear screen, the apparatus comprising a first lever which is rotatably mounted on a first shaft for controlling said rear screen, said first lever having a magnetically responsive element and a cam retarding means operably affixed thereto;

a magnet mounted in an operative relationship to said magnetically responsive element;

means to energize said magnet, said energizing means comprising a first switch means, an energy supply means and a first transistor means connected in series with said magnet;

a delay circuit, said delay circuit comprising a variable resistor, a capacitor, and a second switch means each of which is connected to the base of a second transistor, said delay circuit being energized upon the opening of said second switch means to turn on, after a predetermined time interval, said second transistor to thereby de-energize said magnet;

a delay circuit starting lever mounted on said first shaft and having a first contact thereon, said contact being connected to the base of said second transistor;

an interlock means connected between said first lever and said delay circuit starting lever for interlocking the two levers together to control said rear screen, said interlock means comprising a first spring bias means connected to both of said levers and an adjusting pin mounted on said first lever for engaging said delay circuit starting lever;

a second spring bias means connected between said first lever and a support, said second spring bias means exerting a lesser biasing force than said first bias means;

a lever rotation inhibiting means, said inhibiting means comprising a pin mounted on a support and positioned thereon for engaging said first lever and inhibiting the movement thereof past a given position;

a second shaft having a first and second pulleys, a gear means, and a starting cam fixedly mounted thereon for rotation therewith, said first and second pulleys having connected thereto the front screen strips, said gear means being actuated to windup said front and rear screens, said starting cam being releasable, when the shutter is in the wound up condition, to release the shaft for rotation, said second shaft additionally having the rear screen drum rotatably mounted thereon, said rear screen drum having said rear screen connected thereto;

a further cam means rotatably mounted on said second shaft for rotation with said rear screen, said further cam means being positioned with respect to said first lever to be acted upon by said cam retarding means to thereby control said rear screen, said further cam means having a locus of rotation within the influence of said cam retarding means when said magnetically responsive element is in engagement with said magnet and without the influence of said cam retarding means when said first lever is engaged by said lever rotation inhibiting means;

a second lever fixedly mounted to said second shaft for rotation therewith, said second lever having a second contact thereon mounted for engagement with said first contact when said delay circuit starting lever and said second lever are in a predetermined position, said first and second contacts forming said second switch means;

a third lever rotatably mounted on said second shaft and fixedly connected to said further cam means for rotation therewith, said third lever having pin means mounted thereon which engage said rear screen drum means and prevents the unwinding thereof until said further cam means is released by said cam retarding means at the termination of the predetermined time interval of said delay circuit at which time the magnet is de-energized and the first lever is released;

a pivotally mounted, spring bias latch means mounted to engage said starting cam and prevent the rotation thereof in the unwinding direction; and means to release said latch means for initiating the operation of said shutter, said releasing means including means to close said first switch means to thereby connect said energy supply means to said first transistor means, prior to the release of said latch means.

References Cited

UNITED STATES PATENTS 3,349,678  10/1967  Suzuki et al.

NORTON ANSHER, Primary Examiner

J. F. PETERS, JR., Assistant Examiner

U.S. Cl. X.R.

95—57